July 30, 1929.   R. RASMUSSEN   1,722,540
HARROW DRAWBAR
Filed Sept. 27, 1927
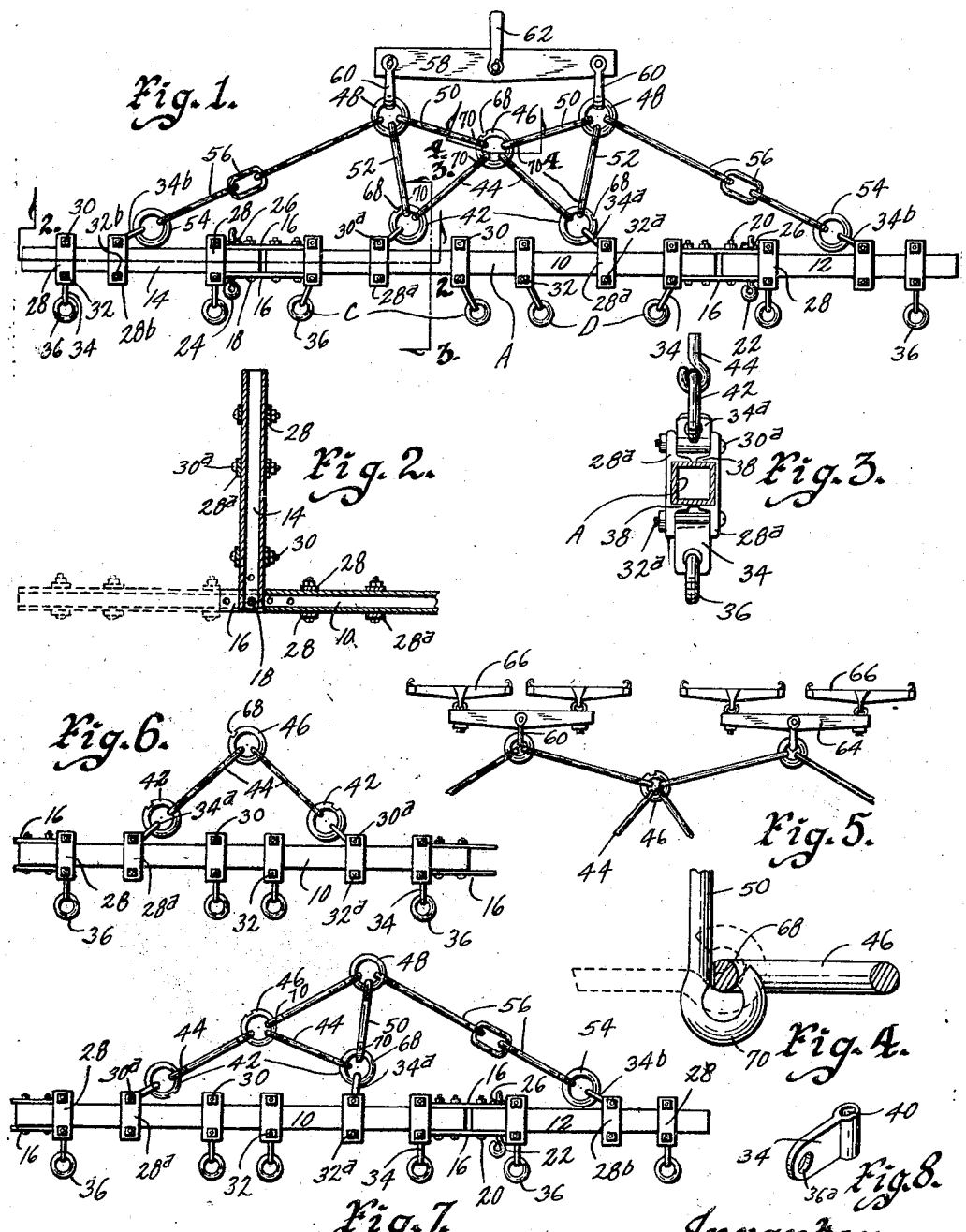
Witness
Vinton Read
Inventor
Rasmus Rasmussen
by Bair & Freeman Attorneys Patented July 30, 1929.

UNITED STATES PATENT OFFICE.

RASMUS RASMUSSEN, OF AUDUBON, IOWA.

HARROW DRAWBAR.

Application filed September 27, 1927. Serial No. 222,297.

The object of my invention is to provide a harrow draw bar of simple, durable and comparatively inexpensive construction.

A further object of my invention is to provide a draw bar consisting of a center portion and two end portions pivoted thereto whereby the end sections may be raised to vertical position for reducing the overall width of the bar when it is desired to pass through a narrow gate.

A further object of my invention is to provide clips adjustable on the bar with link devices on the clips adapted to be attached to the harrow sections.

Still a further object is to provide the connection between the draw bar and the harrow sections in the form of vertically pivoted links whereby the connections can be spread or brought toward each other to accommodate harrow sections having pull bars positioned different distances apart.

Still another object of my invention is to provide the center portion of the draw bar with an independent hitch means so that said portion can be used alone as a harrow draw bar for two harrow sections and to provide the end portions of the draw bar attachable to the center portion thereof whereby they may be used to form a draw bar for three or four harrow sections.

Still a further object is to provide novel hitch means to accommodate the end portions of the draw bar when they are used, with a novel means of detachably securing the hitching means of the end portion to the hitch means of the center portion.

Although the invention is susceptible of a variety of embodiments, it is unnecessary to fully describe and illustrate more than one in order to give a full understanding of the invention both from its structural and functional standpoints.

With these and other objects in view my invention consists in the construction, arrangement and combination of the various parts of my device, whereby the objects contemplated are attained, as hereinafter more fully set forth, pointed out in my claims, and illustrated in the accompanying drawings in which:

Figure 1 is a plan view of my complete four harrow section draw bar.

Figure 2 is a detail sectional view on the line 2—2 of Figure 1.

Figure 3 is an enlarged detail sectional view on the line 3—3 of Figure 1.

Figure 4 is an enlarged sectional detail view upon the line 4—4 of Figure 1.

Figure 5 illustrates a manner of securing double and single trees to the bar shown in Figure 1, for utilizing four horses to draw the harrow sections.

Figure 6 illustrates the center section only of the draw bar.

Figure 7 illustrates the center section and one end section whereby a draw bar for a three section harrow is made of the parts of my device; and Figure 8 is a perspective view of one of the links used in connection with my device.

On the accompanying drawings I have used the reference numeral 10 to indicate the center section of the complete draw bar illustrated in Figure 1 and referred to by the reference character A.

There are two end sections 12 and 14 of the draw bar A which are secured to the center section 10 by two pairs of ears 16, one end of each being secured to an end of the center section 10. The end sections 12 and 14 of the bar A are pivoted as at 18 and 20 to the ears 16.

It will be obvious from the description just made, that the sections 12 and 14 may be swung on the pivotal connections 18 and 20 as illustrated in Figure 2. These end sections may be locked with relation to the center section 10 by removable pins 22 and 24 which are secured in position by cotter keys 26.

By raising the sections 12 and 14 to the position shown in Figure 2, the overall length of the bar A is reduced to that of the center section 10 and the bar can be easily pulled through an ordinary farm gate. By removing the pins 18 and 20, the end sections 12 and 14 can be removed from the center section 10 as illustrated in Figure 6 or only one of them may be removed as illustrated in Figure 7.

The bar illustrated in Figure 1, accommodates four harrow sections and when arranged as shown in Figure 6, it accommodates two harrow sections. The arrangement shown in Figure 6 accommodates three harrow sections.

For securing the bar A to harrow sections, I provide a clip 28 having clamping bolts 30 and 32, a link 34 and a link 36 adapted to be hooked over the hook of the pull bar of a harrow section. The clip 28 is made in two parts, one part being above the bar A and the other part below as illustrated in Figure 3.

Extensions 38 are formed on the clips 28 to contact with the forward and rear sides of the bar A. The links 34 are provided with openings 40 to receive the clamping bolts 32 whereby they are held by the clips 28 to the bar A and are swingably mounted on a vertical axis so that they may be placed in the position illustrated at C for accommodating the pull bars of a harrow section which are far apart or they may be swung to the position illustrated at D to accommodate the pull bars of a harrow which are closer together. This construction allows a universal and simple adjustment to accommodate different types of harrow sections.

Throughout my claims I have designated the clips 28 as means for attaching to the draw bar comprising "flat bars" and the extensions 38 as "lugs". My claims recite the links 34 as having "vertical hubs" and "flat portions", as shown in Figure 8, the opening 40 being provided in the "vertical hub" and the "flat portion" being indicated at 34.

The pulling means for the bar A consists of a pair of clips 28ª similar to the clips 28 which have links 34ª similar to the links 34. Rings 42 extend through the links 34ª and are connected by links 44 to a central pull ring 46. Pull rings 48 are positioned on each side of the pull ring 46 and are connected thereto by links 50. Links 52 connect the pull rings 48 and the rings 42.

The end sections 12 and 14 of the bar A are connected to the pull rings 48 by clips 28ᵇ, links 34ᵇ, rings 54 and links 56.

Any source of power such as a tractor or horses may be secured to the pull rings 48 and in Figure 1, I have shown a connecting tree 58 secured to the rings 48 by clevises 60. A central clevis 62 is provided to which a three or more horse evener may be hitched or the clevis 62 may be attached to a tractor draw bar.

When it is desirable to hitch four horses to the draw bar A, it may be done as illustrated in Figure 5. A double tree 64 is hitched to each ring 48 and single trees 66 are secured to the double trees 64. When it is desirable to use the center section 10 of the draw bar, the two end sections may be removed together with the links 56, 52 and 50 and the hitch rings 48. This leaves the bar as illustrated in Figure 6.

If only one of the end sections is removed, the bar appears as in Figure 7 so that the hitch ring 47 is substantially half way between the ends of the bar formed of the center section 10 and the end section 12.

In order to remove the end sections and the link associated therewith, it is necessary to arrange the links 50 and 52 detachably from the rings 42 and 46. This is done by providing notches 68 in the rings 42 and 46. In Figure 4 an end of the link 50 is illustrated as being curved into a partial circle 70.

The opening left between the circle 70 and the main portion of the link 50, is just wide enough to allow the narrowed portion of the rings 42 and 46 caused by the notches 68 therein, to pass through when the plane of the link is at right angles to the plane of the ring as shown in full lines.

When the two planes referred to, are parallel as illustrated in dotted lines, there is no chance for the ring to slip out of the circle 70 of the link as it is thicker than the opening between the end of the ring and the body portion of the link. Each of the rings 44, 50 and 52 are made detachable in the above described manner.

I have endeavored by my description, to fully describe the details of my invention and some changes may be made in the construction thereof, without departing from the real spirit and purpose of my invention. It is, therefore, my purpose to cover by my claims, such modified forms of structure and use of mechanical equivalents which may be reasonably considered within their scope.

I claim as my invention:—

1. In combination with a harrow draw bar, means for hitching thereto comprising members slidably adjustably on the bar for connecting harrows to the bar, said members each comprising a pair of flat bars adapted to engage opposite sides of the draw bar and clamping bolts extending through said flat bars and a link pivoted on one of said bolts for horizontal swinging movement.

2. A draw bar comprising a draw bar proper, means for hitching thereto comprising a plurality of members each comprising a pair of flat bars engaging opposite sides of the draw bar and clamping bolts extended through said flat bars and lugs on said flat bars adapted to engage the remaining sides of said draw bar.

3. A draw bar comprising a draw bar proper, means for hitching thereto comprising a plurality of members each comprising a pair of flat bars engaging opposite sides of the draw bar and clamping bolts extended through said flat bars, lugs on said flat bars adapted to engage the remaining sides of said draw bar, and a link having a vertically arranged hub pivotally mounted on one of said clamping bolts.

4. A draw bar comprising a draw bar proper, means for hitching thereto comprising a plurality of members each comprising a pair of flat bars engaging opposite sides of the draw bar and clamping bolts extended through said flat bars, lugs on said flat bars adapted to engage the remaining sides of said draw bar, and a link having a flat portion and vertically arranged hub at one edge thereof, said hub being pivotally mounted on one side of said clamping bolts.

5. A harrow draw bar having means for attaching thereto comprising members slidably adjustable on the bar and links pivoted for horizontal swinging movement, said links each comprising a flat vertical member having a vertical hub formed adjacent one edge thereof.

Des Moines, Iowa, September 13, 1927.

RASMUS RASMUSSEN.